UNITED STATES PATENT OFFICE.

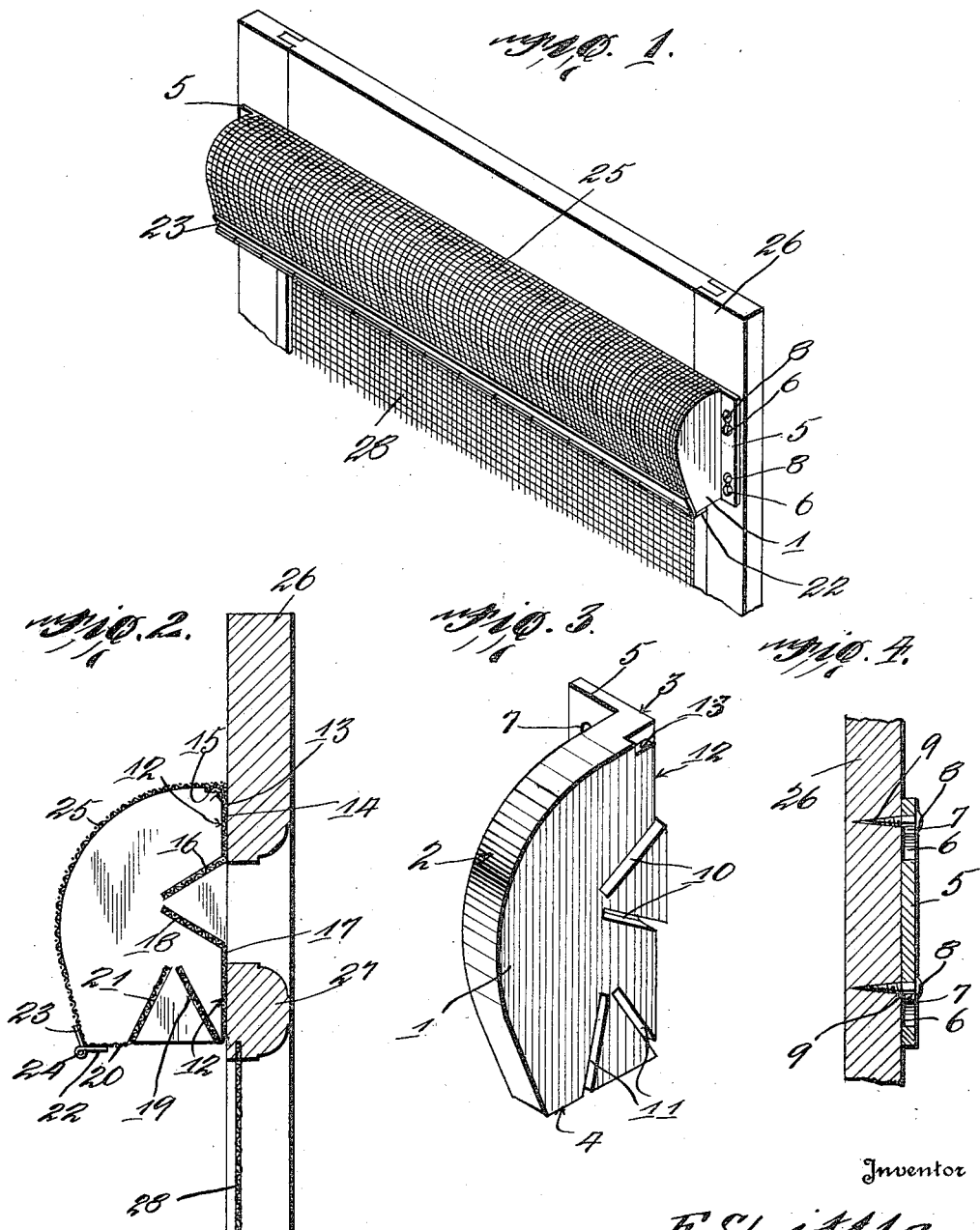

FRED S. LITTLE, OF FAIRFIELD, IOWA, ASSIGNOR OF ONE-HALF TO JOHN SAMUELSON, OF FAIRFIELD, IOWA.

FLY-TRAP.

1,267,237.  Specification of Letters Patent.  Patented May 21, 1918.

Application filed November 6, 1916. Serial No. 129,805.

*To all whom it may concern:*

Be it known that I, FRED S. LITTLE, a citizen of the United States of America, residing at Fairfield, in the county of Jefferson and State of Iowa, have invented certain new and useful Improvements in Fly-Traps, of which the following is a specification, reference being had therein to the accompanying drawing.

This invention relates to fly traps, and has for its principal object the construction of a trap which is adapted to be removably mounted upon a screen in such a manner as to trap the flies either upon the inside or outside of a screen.

Another object of this invention is the production of a fly trap wherein the end plates are adapted to carry wire in such a manner as to permit the trap to be removably mounted upon a screen.

A still further object of this invention is the production of a fly trap wherein there is formed a hinged section so that after the trap has been removed from the screen it may be opened for permitting the trapped flies to be emptied therefrom.

With these and other objects in view this invention consists of certain novel combinations, constructions, and arrangements of parts as will be hereinafter fully described and claimed.

In the accompanying drawing:—

Figure 1 is a detail perspective view of the fly trap as constructed in accordance with this invention, showing the same mounted upon a screen.

Fig. 2 is a central vertical section through the trap and the upper portion of a screen.

Fig. 3 is a detail perspective view of one of the end plates.

Fig. 4 is a vertical section through a side flange and one of the end plates, showing the manner in which the trap is removably supported upon a screen.

Referring to the accompanying drawing by numerals it will be seen that the fly trap comprises a pair of end plates as shown in Fig. 1. Each end plate comprises a body 1 having a substantially rounded outer edge 2, with a straight inner edge 3 and straight bottom edge 4. An integral flange 5 extends at right angles to the body 1 and has the enlarged openings 6 formed therein communicating with the slots 7. Thus, it will be seen that the head 8 of a screw or tack 9 may be passed through the enlarged openings 6 and the flanges 5 and thus the plates may be released so that by their moving downwardly the screws 9 will pass into the slots 7 while the heads 8 will bear upon the outer surface of the flanges 5 thus removably retaining the end plates in position.

Each body 1 is provided with converging grooves 10 extending inwardly toward the central portion of the body and extending from the rear straight edge 3, and, further, with the inwardly converging grooves 11 extending toward the inner central portions of the body 1 and extending from the straight bottom edge 4. It will further be seen that the body 1 is provided with a channel 12 adjacent the inner straight side edge 3 and this channel 12 also communicates with the notch 13.

A sheet of wire mesh 14 is positioned so as to fit within the channel 12, having a bent portion 15 resting within the notches 13 of the end plates. The sheet 14 is then bent so as to have the strip 16 fitting within one of the grooves 10, as shown in Fig. 2. The wire mesh sheet 17 is positioned upon the end plates so as to fit within the lower channels 12 for it is, of course, obvious that the wire sheets 14 and 17 span the distance between the end plates. This sheet 17 also has a rib 18 fitting within the remaining grooves 10 and, therefore, it will be seen that since these grooves 10 converge the strips 16 and 18 will converge so as to form an entrance into the interior of the trap. The mesh sheet 17 also has a strip 19 fitting within one of the converging grooves 11, as this strip 19 extends upwardly from the lower portions of the end plates. Another mesh sheet 20 is fixedly mounted in any suitable manner upon the straight bottom edges 4 of the bodies 1, for instance, as by being soldered, or secured in any such manner, and this sheet 20 also has an upwardly extending strip 21 fitting within the remaining converging grooves 11. Thus, it will be seen that since these grooves 11 also converge the strips 19 and 21 will converge so as to form an entrance opening to the interior of the trap. The leaf 22 is fixedly mounted upon the mesh and also the lower side edges 4 of the bodies 1 adjacent the curved outer edges 2 of the bodies. The leaf 23 is pivotally mounted by means of a pin 24 to the leaf 22 in the usual manner so as to cause the leaf 23 to be pivotally supported upon the end plates. It will be seen that since the leaf 22 is formed of sheet metal it will fixedly retain the end plates in proper spaced relation. The mesh 25 is fixedly mounted upon the pivoting leaf 23, such for instance as by being soldered thereon, and this mesh 25 comprises the pivotally mounted section or movable cover for the trap. It is obvious that when the cover or pivoting section is in a closed position it will fit snugly upon the curved outer edges 2 of the bodies 1 and will also engage the bent over portion 15 of the mesh sheet 14 so as to efficiently inclose the trap for preventing the flies trapped therein from escaping. It is further obvious that because of the fact that the mesh 25 will bear upon the bent over portion 15 the frictional engagement will hold the pivoting section from accidentally opening in view of the fact that the cover or pivoted section is extended when in a closed position so far to one side of the hinge it will be substantially off center and accordingly will normally swing toward a closed position and, therefore, will not accidentally open.

The fly trap is adapted to be mounted upon a screen frame 26 which carries the bar 27 extending transversely thereacross. The screen wire 28 is, of course, carried by the frame 26 and the bar 27 in the usual manner, although it will be seen that the bar 27 is carried in spaced relation with respect to the upper portion of the screen frame 26. It is, of course, obvious that this screen frame may be either a door screen or window screen and that the space between the bar 27 and the top of the screen frame 26 will constitute the space for the entrance of flies therethrough. The screws 9, of course, are carried by the screen frame 26, as shown in Fig. 1.

When this trap is in use it is adapted to be positioned upon the inner side of the screen, whether used upon a screen door or window screen, at which time the screws 9 will be fitting within the slots 7 for removably retaining the fly trap in its correct position. It will be seen that the entrance between the strips 16 and 18 will be in registry with the space between the bar 27 and the top of the screen frame 26 so that flies which may alight upon the outer side of the screen may crawl upwardly or may fly through the space between the bar 27 and the top of the screen so as to alight upon the strips 18 and 16. As the fly continues to crawl it is obvious that it will pass into the trap and because of the narrow space at the entrance adjacent the straps 16 and 18 the fly will be prevented from passing outwardly therebetween. Flies within the room which may alight upon the inner portions of the screen may fly or crawl upwardly into engagement with the strips 19 and 21 and because of the fact that these strips converge it is obvious that a fly will be directed into the interior of the trap and will be prevented from escaping. Thus, it will be seen that the trap will catch the flies which may alight upon either the outside or inside of the screen and will prevent their escaping.

When it is desired to empty the trap it will be seen that it may be lifted slightly upwardly so as to permit the heads 8 to pass through the openings 6 formed in the flanges 5. The trap may then be taken wherever desired and then the pivoted section or cover 25 may be swung outwardly from the bodies 1, thus causing the trap to be opened. The trap may then be emptied and after this action takes place the pivoted section may be again closed so as to permit the trap to be replaced upon the screen frame in condition to further trap flies alighting upon the screen frame and passing thereinto.

From the foregoing description it will be seen that a very simple and efficient fly trap has been produced which is constructed so as to trap flies upon either the inside or the outside of a frame and which has its entrance portions so formed as to properly direct flies into the trap, although preventing their escape. It is further obvious that the formation of the end plates will firmly hold the wire mesh in its correct position, but will also support the pivoted cover, also formed of screen wire, so as to hold the trap in a closed position, although permitting the same to be opened when it is desired to empty the same.

What is claimed is:—

In a device of the class described, the combination of a pair of end plates, each end plate comprising a body having an outwardly extending flange of the same length as the height of the body, each of said plates provided at the top of the inner edge and on the inner face with a horizontal notch, said plate provided on its inner face with converging slots extending inwardly from the inner edge, and separated at their inner end, said plate provided on its inner face and at its lowest edge with a second pair of converging slots, said slots extending upwardly and separated at their inner ends, mesh sheets in the pair of converging slots and constituting fly-run-ways, a mesh strip attached to the lower edges of said blocks, an inner mesh strip attached to the inner edges of said blocks and bent at opposite upper ends into said horizontal notches of said blocks, and a removable cover on the outer edges of said blocks, substantially as shown and described.

In testimony whereof I hereunto affix my signature.

FRED S. LITTLE.